United States Patent
Simmons et al.

(10) Patent No.: US 12,349,633 B2
(45) Date of Patent: Jul. 8, 2025

(54) AGRICULTURAL BALER WITH GRASPING BALE RELEASE RAMP

(71) Applicant: CNH Industrial America LLC, New Holland, PA (US)

(72) Inventors: Scott C. Simmons, Lititz, PA (US); Kevin M. Smith, Narvon, PA (US); Albert Childs, Meadville, PA (US); Daniel M. Geesey, East Petersburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 817 days.

(21) Appl. No.: 17/564,644

(22) Filed: Dec. 29, 2021

(65) Prior Publication Data

US 2023/0200305 A1 Jun. 29, 2023

(51) Int. Cl.
*A01F 15/08* (2006.01)
*A01D 90/10* (2006.01)

(52) U.S. Cl.
CPC .......... *A01F 15/0883* (2013.01); *A01D 90/10* (2013.01)

(58) Field of Classification Search
CPC ............................ A01F 15/0883; A01D 90/10
See application file for complete search history.

(56) References Cited

U.S. PATENT DOCUMENTS

| | | |
|---|---|---|
| 4,187,941 A | 2/1980 | Martin |
| 6,514,029 B2 * | 2/2003 | Millsap .................. A01D 90/08 414/24.5 |
| 7,568,425 B2 | 8/2009 | Viaud |
| 8,978,549 B2 | 3/2015 | Thompson et al. |
| 10,091,937 B2 | 10/2018 | Fay, II et al. |
| 10,136,581 B2 | 11/2018 | Millsap |
| 10,681,871 B1 * | 6/2020 | Fay, II .................... A01D 90/08 |

(Continued)

FOREIGN PATENT DOCUMENTS

| | | | | |
|---|---|---|---|---|
| DE | 3607040 A1 * | 9/1987 | ......... | A01F 15/0883 |
| DE | 102018208821 A1 * | 12/2019 | ............. | A01F 15/02 |

(Continued)

OTHER PUBLICATIONS

Extended European Search Report for EP Application No. 22213074.2 dated May 15, 2023 (five pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A bale release assembly for an agricultural baler includes: a pair of spaced apart side sheets defining a bale release opening with an opening width therebetween; a tailgate associated with the bale release opening and defining a closed position where the tailgate closes the bale release opening and an open position where the bale release opening is open; and a pair of grasping arms associated with the bale release opening and pivotable about a pivot axis. The grasping arms are each movable between a respective ramp position to form a ramp from the bale release opening to the ground and a respective grasping position where a grasping width defined between the grasping arms is greater than the opening width. The grasping arms define a ramp width therebetween that is less than the grasping width when each grasping arm is in its respective ramp position.

17 Claims, 6 Drawing Sheets

(56) References Cited

U.S. PATENT DOCUMENTS

| | | | | |
|---|---|---|---|---|
| 2005/0045051 A1* | 3/2005 | Viaud | ................ | A01F 15/0883 100/88 |
| 2014/0174304 A1* | 6/2014 | Blough | ............... | A01F 15/0883 100/76 |
| 2017/0013783 A1* | 1/2017 | Kirk | .................... | A01F 15/0883 |
| 2019/0364739 A1 | 12/2019 | Gresset et al. | | |

FOREIGN PATENT DOCUMENTS

| | | | | |
|---|---|---|---|---|
| DE | 20 2019 103 667 U1 | 11/2020 | | |
| EP | 1151657 A1 * | 11/2001 | ......... | A01F 15/0883 |
| EP | 1512320 A2 | 3/2005 | | |
| EP | 2384617 A1 * | 11/2011 | ......... | A01F 15/0883 |
| FR | 2587875 A1 * | 11/2020 | ......... | A01F 15/0883 |

* cited by examiner

AGRICULTURAL BALER WITH GRASPING BALE RELEASE RAMP

BACKGROUND OF THE INVENTION

The present invention pertains to agricultural vehicles and, more specifically, to agricultural vehicles that form bales.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting assembly, a bale chamber for forming a bale, and a wrapping mechanism for wrapping or tying a material around the bale after it has been formed in the bale chamber. As the baler is towed over a windrow, the pickup unit lifts the crop material into the baler. Then, the crop material may be cut into smaller pieces by the cutting assembly. As the crop material enters the bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

Discharged bales are collected from a field for transport. The discharged bales all being aligned with one another in a row and evenly spaced assists in quickly and efficiently collecting the bales. Further, certain systems such as autonomous bale collection systems rely on the placement of discharged bales being predictable. When bales, especially round bales, are released, the bales may have a tendency to roll away from the discharge location. While nominal rolling can be accounted for, more significant rolling of the bale from the discharge location can slow down the collection process.

What is needed in the art is a way to reduce the detrimental effects of bales rolling from their discharge location.

SUMMARY OF THE INVENTION

Exemplary embodiments provided according to the present disclosure include grasping arms that are each movable to a respective grasping position where a grasping width defined between the grasping arms is greater than an opening width of a bale release opening and/or a bale width of a bale.

In some exemplary embodiments provided in accordance with the present disclosure, a bale release assembly for an agricultural baler includes: a pair of spaced apart side sheets defining a bale release opening with an opening width therebetween; a tailgate associated with the bale release opening and defining a closed position where the tailgate closes the bale release opening and an open position where the bale release opening is open; and a pair of grasping arms associated with the bale release opening and pivotable about a pivot axis. The grasping arms are each movable between a respective ramp position to form a ramp from the bale release opening to the ground and a respective grasping position where a grasping width defined between the grasping arms is greater than the opening width. The grasping arms define a ramp width therebetween that is less than the grasping width when each grasping arm is in its respective ramp position.

In some exemplary embodiments provided in accordance with the present disclosure, an agricultural baler includes: a chassis; a bale chamber carried by the chassis and configured to form a bale defining a bale width; a pair of spaced apart side sheets defining a bale release opening; a tailgate associated with the bale release opening and defining a closed position where the tailgate closes the bale release opening to keep the bale in the bale chamber and an open position where the bale release opening is open to release the bale from the bale chamber;

and a pair of grasping arms associated with the bale release opening and pivotable about a pivot axis. The grasping arms are each movable between a respective ramp position to form a ramp from the bale release opening to the ground and a respective grasping position where a grasping width defined between the grasping arms is greater than the bale width. The grasping arms define a ramp width therebetween that is less than the grasping width when each grasping arm is in its respective ramp position.

One possible advantage that may be realized by exemplary embodiments provided according to the present disclosure is that the grasping arms can act as a ramp in the respective ramp positions while also being able to move outwardly to the respective grasping positions before moving again inwardly to squeeze a released bale.

Another possible advantage that may be realized by exemplary embodiments provided according to the present disclosure is that the grasping arms can be pivoted to adjust an incline of the ramp.

Yet another possible advantage that may be realized by exemplary embodiments provided according to the present disclosure is that the grasping arms can be used solely to squeeze released bales to reduce the risk of the released bales excessively rolling.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
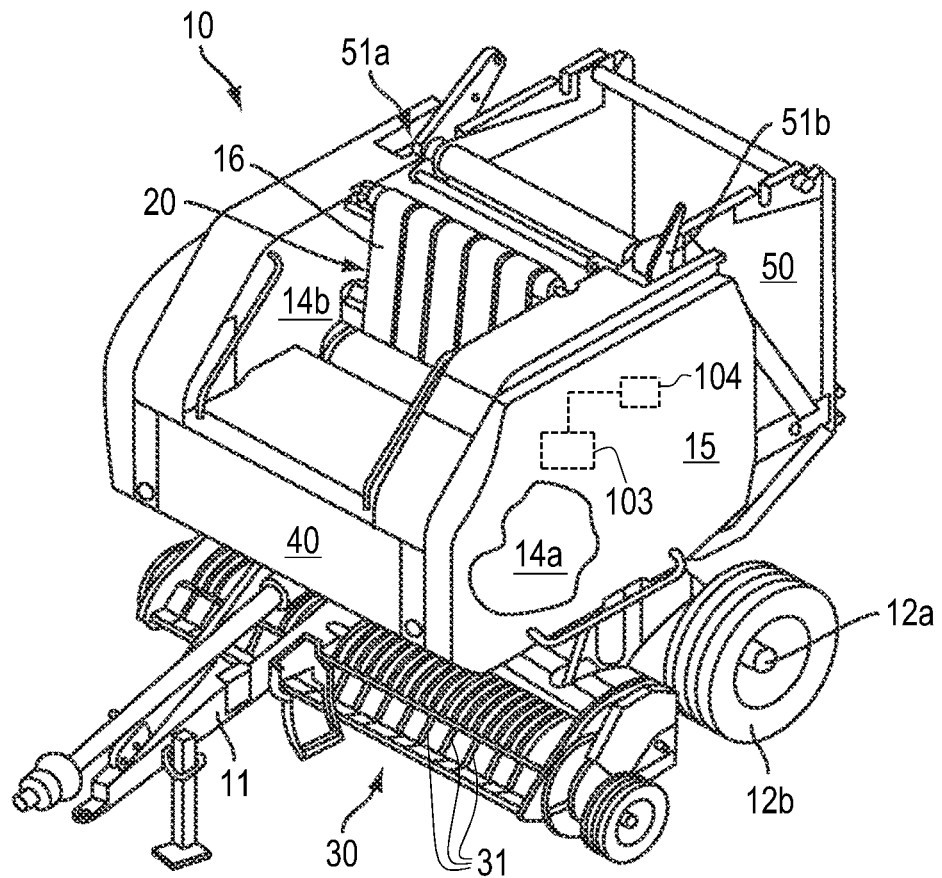
FIG. 1 illustrates a perspective view of an exemplary embodiment of an agricultural baler including a bale release assembly, provided in accordance with the present disclosure.
Figure 2:
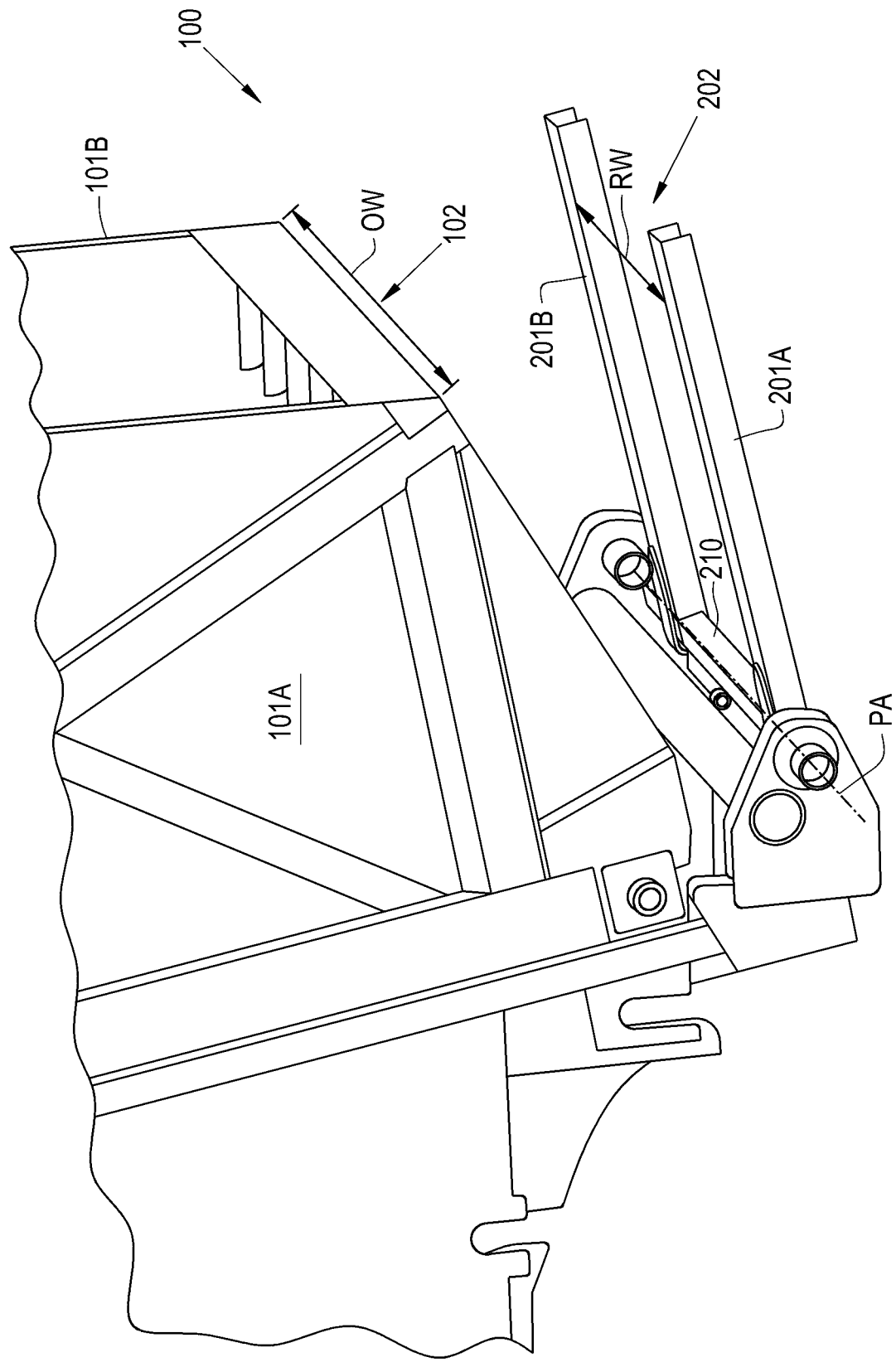
FIG. 2 illustrates a side view of the bale release assembly of FIG. 1 with grasping arms each in a ramp position.

Referring now to the drawings, and more particularly to FIG. 1, an exemplary embodiment of an agricultural vehicle 10, illustrated in the form of an agricultural round baler, is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale chamber 20. Cut crop material is picked up by a plurality of tines 31 of a transverse pickup 30 and conveyed through a harvesting assembly into the bale chamber 20 where it is formed into a cylindrically shaped bale by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is released onto the ground. It should be appreciated that while the agricultural baler 10 is illustrated and described as a round baler, in some embodiments the agricultural baler 10 is configured as a square baler.

In known agricultural balers, released bales are often prone to significant rolling when released on an incline, such as a hill. Round bales are especially prone to such rolling, but square bales may also roll. Significant rolling of the bales cause the bales to move unpredictably, which can make collection of the bales less efficient. In extreme cases, rolling of one or more bales can lead to damage and/or loss of the bale(s).

To address some of the previously described issues, and referring now to FIGS. 2-6 as well, the agricultural baler 10 includes a bale release assembly 100 that includes a pair of spaced apart side sheets 101A, 101B defining a bale release opening 102, the previously described tailgate 50 associated with the bale release opening 102, and a pair of grasping arms 201A, 201B associated with the bale release opening 102. The bale chamber 20 is configured to form a bale 501 (illustrated in FIG. 5) with a bale width BW. In some embodiments, the bale release opening 102 has an opening width OW that corresponds to the bale width BW of the bale 501 formed by the bale chamber 20. However, it should be appreciated that the opening width OW may differ from the bale width BW, e.g., the opening width OW may be slightly greater than the bale width BW to reduce the risk of the bale 501 becoming stuck during release. The tailgate 50 has a closed position (illustrated, for example, in FIG. 1) where the tailgate 50 closes the bale release opening 102 to keep the bale 501 in the bale chamber 20 and an open position (illustrated, for example, in FIG. 5) where the bale release opening 102 is open to release the bale 501 from the bale chamber 20. When the tailgate 50 is in the open position, the bale 501 may be released from the bale chamber 20 solely due to gravity or due to the influence of another element, such as a hydraulic or spring-activated kicker, as is known.

The grasping arms 201A, 201B are pivotable about a pivot axis PA, which allows a ramp angle of the grasping arms 201A, 201B to be adjusted. The grasping arms 201A, 201B are also each movable, e.g., laterally, between a respective ramp position (illustrated in FIGS. 2-3) to form a ramp 202 from the bale release opening 102 to the ground, which released bales can roll down. Each grasping arm 201A, 201B is also movable to a respective grasping position (illustrated in FIG. 4) where a grasping width GW defined between the grasping arms 201A, 201B is greater than the bale width BW and/or the opening width OW. As can be appreciated from FIGS. 2-4, the grasping arms 201A, 201B define a ramp width RW therebetween that is less than the grasping width GW when each grasping arm 201A, 201B is in its respective ramp position. The ramp width RW may also be less than the bale width BW so the released bale 501 rolls down the formed ramp 202. The grasping arms 201A, 201B are thus movable between different positions to adjust a width between the grasping arms 201A, 201B, the significance of which will be described further herein. While the grasping arms 201A, 201B are illustrated as having a C-channel shape, it should be appreciated that the grasping arms 201A, 201B may be formed with any suitable shape including, but not limited to, the illustrated C-channel shape, a straight bar shape, a curved bar shape, etc.

Figure 5:
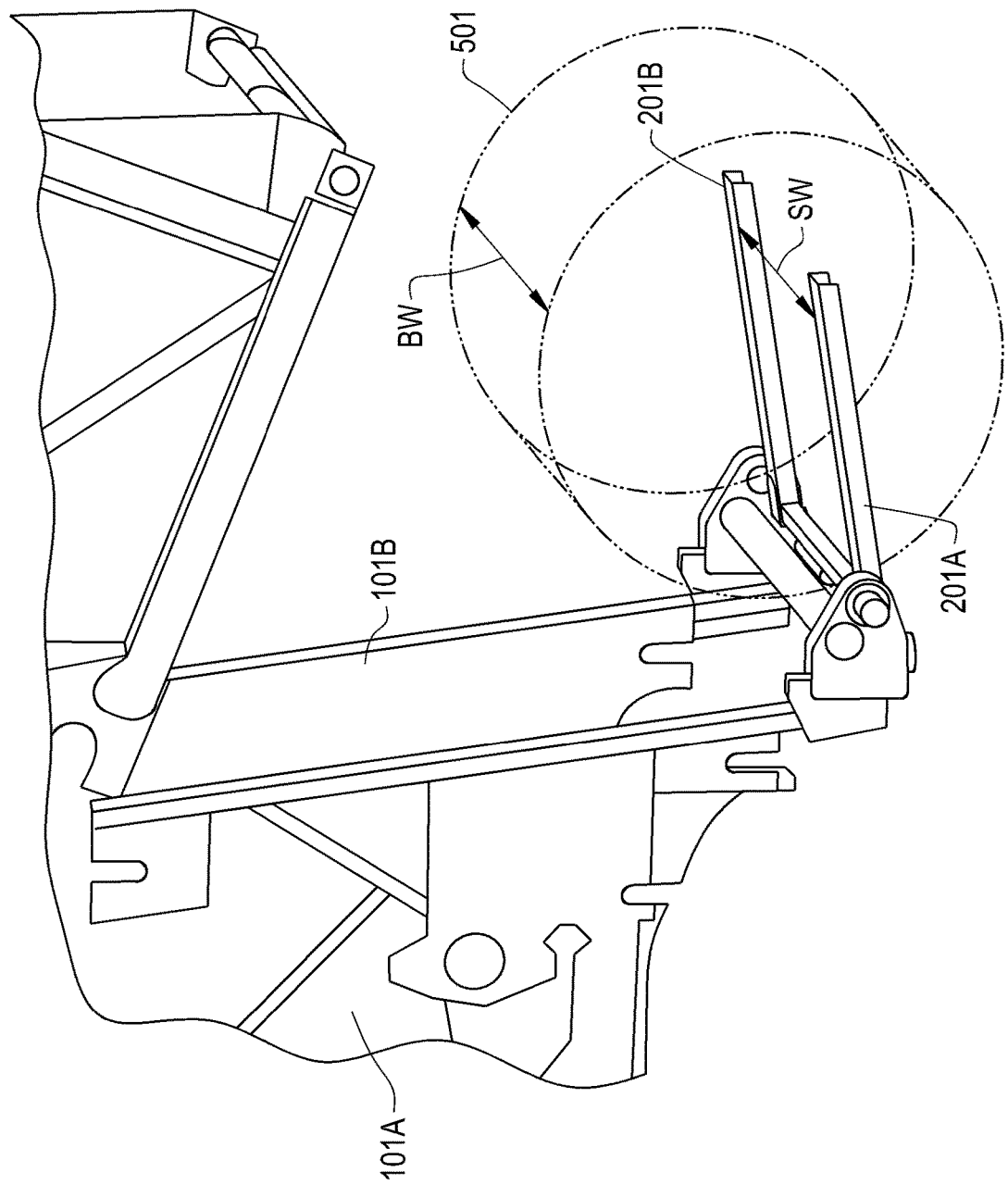
FIG. 5 illustrates a side assembly of the bale release assembly of FIGS. 1-4 when the grasping arms have each moved to a squeezing position to squeeze a released bale.

Referring now to FIG. 5, it is illustrated how the grasping arms 201A, 201B are in a squeezing position so the grasping arms 201A, 201B define a squeezing width SW therebetween that is less than the grasping width GW but greater than the ramp width RW. When the grasping arms 201A, 201B are in the squeezing position, the grasping arms 201A, 201B can be squeezing the formed bale 501 therebetween. In this respect, the squeezing width SW can be slightly less than the bale width BW so the grasping arms 201A, 201B compress the bale 501 and stop the bale 501 from moving, i.e., rolling. As used herein, the squeezing width SW is "slightly less" than the bale width BW when the squeezing width SW is no more than 15% less than the bale width BW so the grasping arms 201A, 201B do not excessively squeeze the bale 501 in the squeezing position. Thus, the grasping arms 201A, 201B can be moved from the ramp position to the grasping position in anticipation of the bale 501 being released and, when the bale 501 is released, moved to the squeezing position in order to stop movement of the bale 501. The grasping arms 201A, 201B can then be returned to the grasping position so the agricultural baler 10 can move forward, leaving behind the bale 501 in a position where the bale 501 should be less prone to rolling. It should be appreciated that, in some embodiments, the grasping arms 201A, 201B do not move to the ramp position to form a ramp 202, and instead move only between the grasping position and the squeezing position in order to squeeze a released bale 501 and reduce the risk of the released bale 501 excessively rolling. In some embodiments, the grasping width GW is only slightly greater than the bale width BW and/or the opening width OW so, as the bale 501 is released, friction between the grasping arms 201A, 201B and the bale 501 is sufficient to prevent the bale 501 from rolling away without needing to squeeze the bale 501 with the grasping arms 201A, 201B; once the bale 501 stops moving, the grasping arms 201A, 201B can then be further moved outward to release the bale 501.

Figure 3:
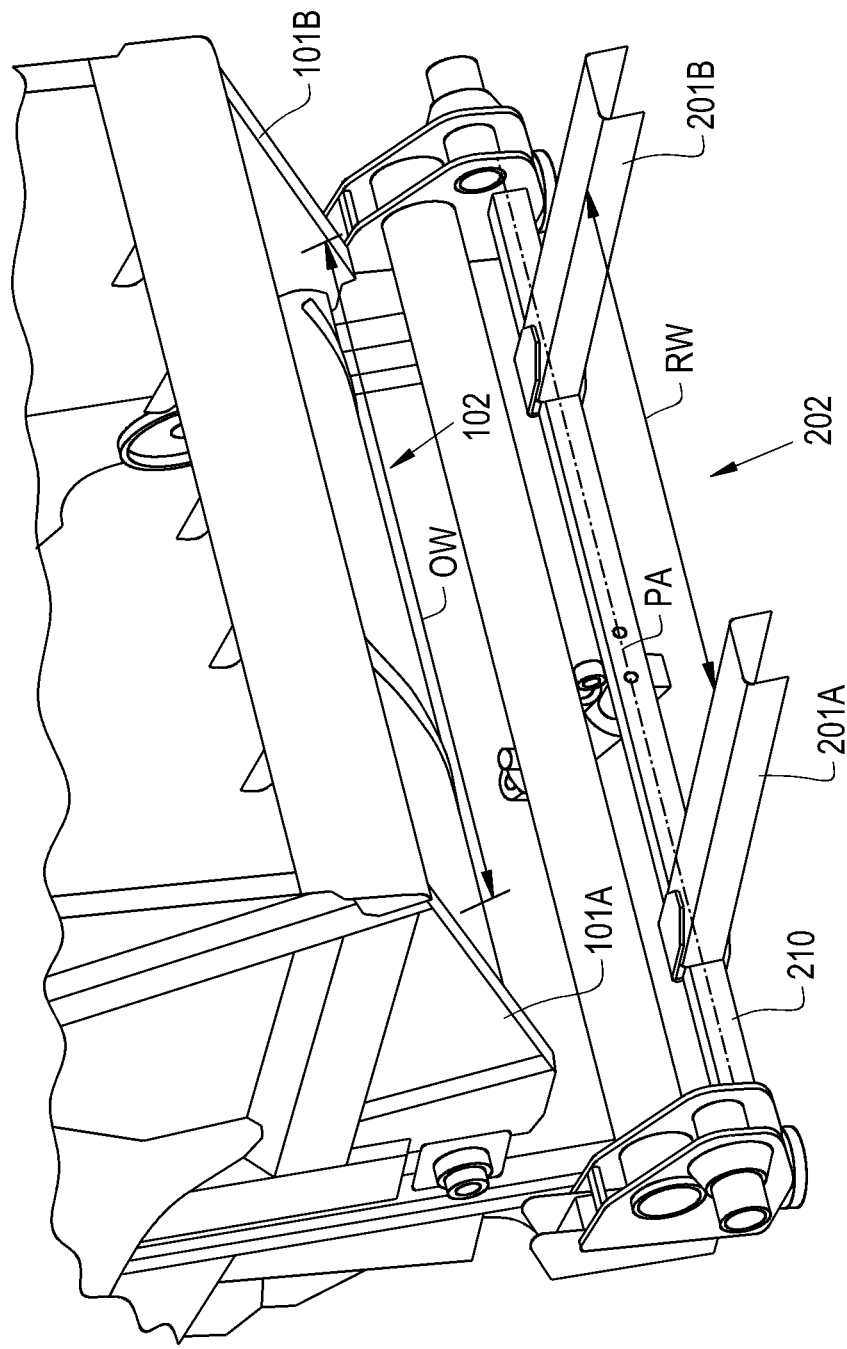
FIG. 3 illustrates a perspective view of the bale release assembly of FIGS. 1-2.
Figure 4:
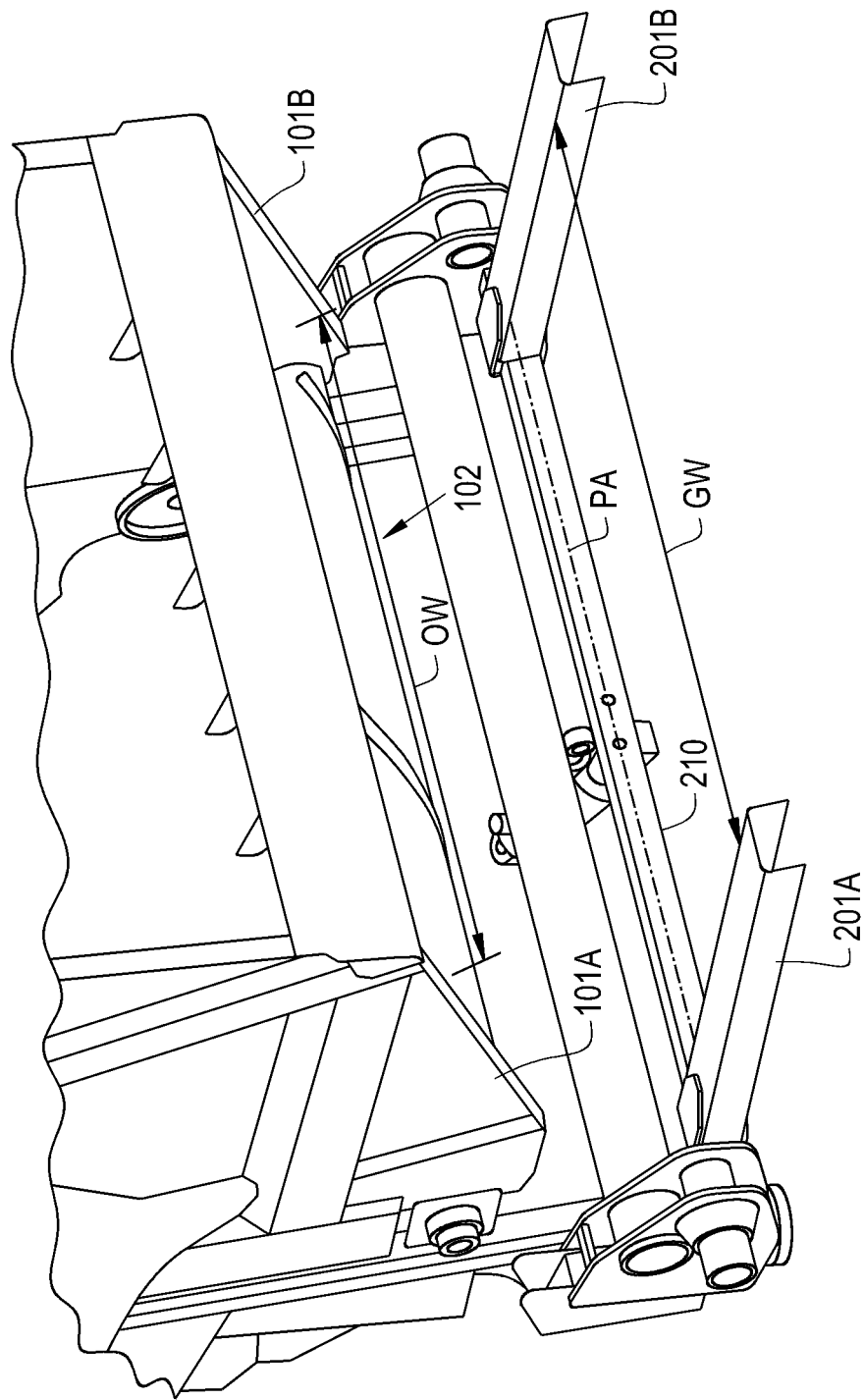
FIG. 4 illustrates a perspective view of the bale release assembly of FIGS. 1-3 when the grasping arms have each moved to a grasping position.

In some embodiments, each of the side sheets 101A, 101B defines a respective vertical plane. Each grasping arm 201A, 201B may be located between the vertical planes in the respective ramp position, as best seen in FIG. 3, and outside the vertical planes in the respective grasping position, as best seen in FIG. 4. When the grasping arms 201A, 201B are in the respective ramp positions within the vertical planes, the bale 501 being released from the bale release opening 102 will be released onto the ramp 202 formed by the grasping arms 201A, 201B so the released bale 501 rolls along the grasping arms 201A, 201B to the ground. The grasping arms 201A, 201B may each be in the ramp position, for example, when the agricultural baler 10 is traveling on relatively level ground where it is unlikely for the released bale 501 to roll significantly. When the agricultural baler 10 is traveling on an incline, e.g., a hill, where the formed bale 501 is at risk of significantly rolling, the grasping arms 201A, 201B can be moved to the grasping positions prior to opening the tailgate 50 and releasing the bale 501 from the bale chamber 20. The grasping arms 201A, 201B being outside the vertical planes defined by the side sheets 101A, 101B ensures that the grasping arms 201A, 201B are in a position where the grasping arms 201A, 201B can be moved towards one another to the squeezing position in order to squeeze the released bale 501. When the bale 501 is released from the bale chamber 20 to the ground, the grasping arms 201A, 201B can then be moved from the grasping position to the squeezing position to squeeze the released bale 501 and prevent further movement of the bale 501, as previously described. The grasping arms 201A, 201B can then be moved to the grasping position out of contact with the formed bale 501 so the agricultural baler 10 can move forward and leave the released bale 501 behind. The grasping arms 201A, 201B may stay in the grasping position or, if the agricultural baler 10 moves to a location where it is unlikely that released bales will roll significantly, the grasping arms 201A, 201B can be moved to the ramp position to form the ramp 202.

Figure 6:
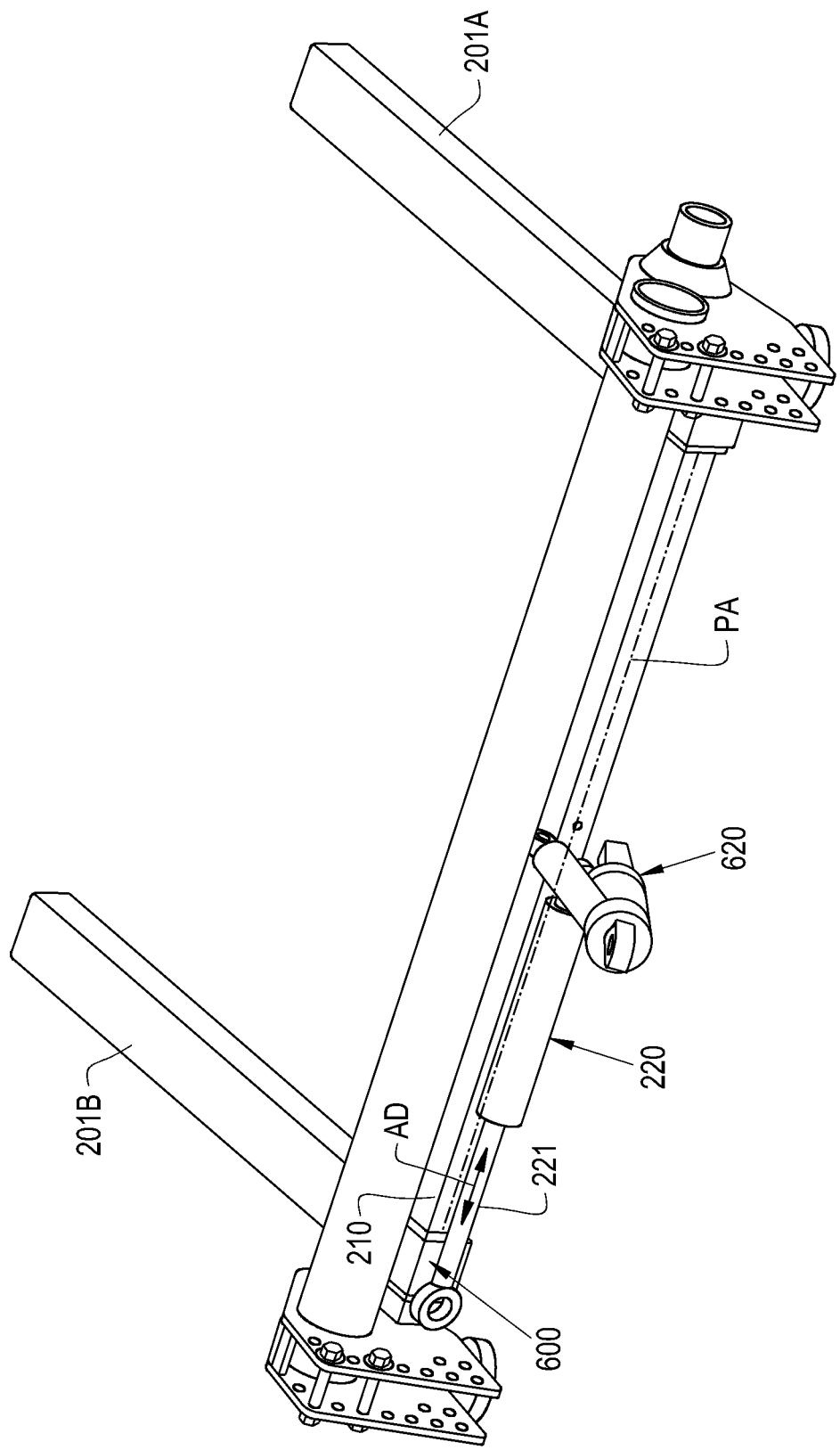
FIG. 6 illustrates a rear view of the bale release assembly of FIGS. 1-5 so an actuator and a movement mechanism can be seen.

In some embodiments, each of the grasping arms 201A, 201B is linearly movable between the respective ramp position and the respective grasping position. The grasping arms 201A, 201B may be linearly movable, for example, by coupling to a track 210 defining the pivot axis PA, which the grasping arms 201A, 201B also pivot about. As illustrated in FIG. 6, one or both of the grasping arms 201A, 201B may be coupled to an actuator 220 that is configured to move the grasping arms 201A, 201B along the track 210 between the respective ramp position and the respective grasping position. The actuator 220 may be, for example, a hydraulic cylinder that couples to a movement mechanism 600 coupled to both of the grasping arms 201A, 201B. The movement mechanism 600 can be configured so movement of an actuator rod 221 of the actuator 220 in an actuating direction, indicated by arrow AD, causes one of the grasping arms 201A to move in the actuating direction AD and the other one of the grasping arms 201B to move in a direction opposite to the actuating direction AD. The movement mechanism 600 may include, for example a rack and pinion. Providing such a movement mechanism 600 allows the grasping arms 201A, 201B to move apart or towards one another using a single actuator 220. In some embodiments, each grasping arm 201A, 201B is coupled to a respective actuator, which may also be coupled to the track 210, so the grasping arms 201A, 201B can move independently. When each grasping arm 201A, 201B is coupled to a respective actuator, each actuator may extend or retract its respective actuator rod to move the coupled grasping arm 201A, 201B. A separate pivoting actuator 620 may also be provided that is coupled to the track 210 and is configured to pivot the track 210 and cause a corresponding pivoting of the coupled grasping arms 201A, 201B. In addition to moving the grasping arms 201A, 201B between the respective ramp position and respective grasping position, the actuator 220 can also be configured to move each of the grasping arms 201A, 201B to the respective squeezing position. Alternatively, the grasping arms 201A, 201B may be pivotable about the pivot axis PA and also pivotable between the ramp position, the grasping position, and, in some embodiments, the squeezing position.

In some embodiments, the agricultural baler 10 includes a controller 103 that is operably coupled to the actuator 220 to control movement of the grasping arms 201A, 201B during operation of the baler 10. The controller 103 may be configured to determine an inclined surface condition exists, e.g., the agricultural baler 10 is on a hill or other terrain where a released bale would tend to excessively roll. The controller 103 may be configured to output a grasping signal to the actuator 220 so the actuator 220 moves each grasping arm 201A, 201B from its respective ramp position to its respective grasping position responsively to determining the inclined surface condition exists. In some embodiments, the baler 10 includes an inclinometer 104 that is operably coupled to the controller 103 and configured to output an inclination signal to the controller 103. The inclination signal may correspond to an inclination of the baler 10, which can indicate that the baler 10 is on a hill or other inclined surface. The controller 103 may be configured to determine the inclined surface condition exists based on the inclination signal. In some embodiments, the controller 103 can also determine if the baler 10 is on flat ground based on the inclination signal output by the inclinometer 104, in which case the controller 103 can output a ramp signal to the actuator 220 so the grasping arms 201A, 201B are moved to the respective ramp position if the grasping arms 201A, 201B are not already in the respective ramp position.

The controller 103 may determine a bale 501 has been released from the bale release opening 102 and output a squeezing signal to the actuator 220 so the actuator 220 moves each grasping arm 201A, 201B from its respective grasping position to its respective squeezing position responsively to determining the bale 501 has been released. The controller 103 may, for example, be operably coupled to a tailgate actuator that is configured to lift the tailgate 50 and determine a bale has been released when the tailgate actuator activates to open the tailgate 50 and release a bale. Alternatively, or in addition, the controller 103 may be configured to output the squeezing signal responsively to receiving a bale release signal from an optical sensor or other element that is configured to detect a bale is released through the bale release opening 102 to the ground.

By outputting the squeezing signal after determining the bale 501 has been released, the controller 103 can cause the actuator 220 to move the grasping arms 201A, 201B and squeeze the released bale 501. The grasping arms 201A, 201B can be stopped from moving once reaching the squeezing position, which stops movement of the released bale 501 that is squeezed by the grasping arms 201A, 201B. The controller 103 can be further configured to output another grasping signal to the actuator 220 after outputting the squeezing signal so the grasping arms 201A, 201B are moved back to the grasping position in order to let go of the bale 501 and allow the baler 10 to move forward without carrying the bale 501. In some embodiments, the controller 103 is configured to output another grasping signal following a defined time period after outputting the squeezing signal, e.g., 3-5 seconds after outputting the squeezing signal.

From the foregoing, it should be appreciated that the bale release assembly 100, and the baler 10 including the bale release assembly 100, allows bales to be released and predictably placed by moving the grasping arms 201A, 201B to different positions. When the baler 10 is on non-inclined surfaces, the grasping arms 201A, 201B can form the ramp 202 so released bales can roll away from the baler 10. When the baler 10 is on inclined surfaces, the grasping arms 201A, 201B can move between the grasping position and the squeezing position to squeeze released bales and stop them from rolling further. Thus, the bale release assembly 100 provided according to the present disclosure can assist in predictably placing released bales on a field for collection.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A bale release assembly for an agricultural baler, comprising:
a pair of spaced apart side sheets defining a bale release opening with an opening width therebetween;
a tailgate associated with the bale release opening and defining a closed position where the tailgate closes the bale release opening and an open position where the bale release opening is open;
a track defining a pivot axis; and
a pair of grasping arms associated with the bale release opening, coupled to the track, and pivotable about the pivot axis, the grasping arms each being movable on the track in a direction along the pivot axis and pivotable about the pivot axis between a respective ramp position to form a ramp from the bale release opening to the ground and a respective grasping position where a grasping width defined between the grasping arms is greater than the opening width, the grasping arms defining a ramp width therebetween that is less than the grasping width when each grasping arm is in its respective ramp position.

2. The bale release assembly of claim 1, wherein each of the side sheets defines a respective vertical plane, each of the grasping arms being located between the vertical planes in the respective ramp position and outside the vertical planes in the respective grasping position.

3. The bale release assembly of claim 2, wherein each of the grasping arms is linearly movable between the respective ramp position and the respective grasping position.

4. The bale release assembly of claim 1, further comprising an actuator coupled to at least one of the grasping arms and configured to move each of the grasping arms along the track between the respective ramp position and the respective grasping position.

5. The bale release assembly of claim 1, further comprising an actuator coupled to at least one of the grasping arms and configured to move each of the grasping arms between the respective ramp position and the respective grasping position.

6. The bale release assembly of claim 5, wherein the actuator is configured to move each of the grasping arms to a respective squeezing position where the grasping arms define a squeezing width therebetween that is greater than the ramp width and less than the grasping width.

7. The bale release assembly of claim 6, further comprising a controller operably coupled to the actuator, the controller being configured to:
determine an inclined surface condition exists;
output a grasping signal to the actuator so the actuator moves each grasping arm from its respective ramp position to its respective grasping position responsively to determining the inclined surface condition exists;
determine a bale has been released from the bale release opening; and
output a squeezing signal to the actuator so the actuator moves each grasping arm from its respective grasping position to its respective squeezing position responsively to determining the bale has been released.

8. An agricultural baler, comprising:
a chassis;
a bale chamber carried by the chassis and configured to form a bale defining a bale width;
a pair of spaced apart side sheets defining a bale release opening;
a tailgate associated with the bale release opening and defining a closed position where the tailgate closes the bale release opening to keep the bale in the bale chamber and an open position where the bale release opening is open to release the bale from the bale chamber;
a track defining a pivot axis; and
a pair of grasping arms associated with the bale release opening, coupled to the track, and pivotable about the pivot axis, the grasping arms each being movable on the track in a direction along the pivot axis and pivotable about the pivot axis between a respective ramp position to form a ramp from the bale release opening to the ground and a respective grasping position where a grasping width defined between the grasping arms is greater than the bale width, the grasping arms defining a ramp width therebetween that is less than the grasping width when each grasping arm is in its respective ramp position.

9. The agricultural baler of claim 8, wherein each of the side sheets defines a respective vertical plane, each of the grasping arms being located between the vertical planes in the respective ramp position and outside the vertical planes in the respective grasping position.

10. The agricultural baler of claim 9, wherein each of the grasping arms is linearly movable between the respective ramp position and the respective grasping position.

11. The agricultural baler of claim 8, further comprising an actuator coupled to at least one of the grasping arms and configured to move each of the grasping arms along the track between the respective ramp position and the respective grasping position.

12. The agricultural baler of claim 8, further comprising an actuator coupled to at least one of the grasping arms and configured to move each of the grasping arms between the respective ramp position and the respective grasping position.

13. The agricultural baler of claim 12, wherein the actuator is configured to move each of the grasping arms to a respective squeezing position where the grasping arms define a squeezing width therebetween that is greater than the ramp width and less than the grasping width.

14. The agricultural baler of claim 13, further comprising a controller operably coupled to the actuator, the controller being configured to:
   determine an inclined surface condition exists;
   output a grasping signal to the actuator so the actuator moves each grasping arm from its respective ramp position to its respective grasping position responsively to determining the inclined surface condition exists;
   determine the bale has been released from the bale release opening; and
   output a squeezing signal to the actuator so the actuator moves each grasping arm from its respective grasping position to its respective squeezing position responsively to determining the bale has been released.

15. The agricultural baler of claim 14, wherein the squeezing width is slightly less than the bale width.

16. The agricultural baler of claim 14, further comprising an inclinometer operably coupled to the controller and configured to output an inclination signal to the controller, the controller being configured to determine the inclined surface condition exists based on the inclination signal.

17. The agricultural baler of claim 8, wherein the ramp width is less than the bale width.

* * * * *